United States Patent

Ward et al.

[11] Patent Number: 5,988,571
[45] Date of Patent: Nov. 23, 1999

[54] TV/VCR MOUNT

[76] Inventors: Glenn F. Ward, 45 River Dr. S. Apt. 3304, Jersey City, N.J. 07310-1741; Wendy A. Ward, 514 Tilden Ave., Teaneck, N.J. 07666-2506

[21] Appl. No.: 08/935,021

[22] Filed: Sep. 22, 1997

[51] Int. Cl.[6] .................................................. F16M 11/00
[52] U.S. Cl. ...................... 248/176.1; 248/243; 248/918
[58] Field of Search .............................. 248/176.1, 442.2, 248/298.1, 278.1, 309.1, 324, 346.03, 176, 912, 918, 243, 244, 245, 261, 242, 283.1, 281.11, 235, 250; 108/96, 144; 211/27; 40/345

[56] References Cited

U.S. PATENT DOCUMENTS

| | | | |
|---|---|---|---|
| 1,108,687 | 8/1914 | Boorman | 248/442.2 |
| 1,113,771 | 10/1914 | Gardner | 248/454 |
| 1,264,484 | 4/1918 | Bridgman . | |
| 1,700,629 | 1/1929 | Douglas | 40/345 |
| 2,083,299 | 6/1937 | Hunter | 248/500 |
| 2,749,071 | 6/1956 | Remstein | 248/172 |
| 2,805,776 | 9/1957 | Levitin | 211/27 |
| 2,828,096 | 3/1958 | Beri | 43/21.2 |
| 3,511,461 | 5/1970 | Clark | 248/27.8 |
| 3,765,633 | 10/1973 | Caudill | 248/229 |
| 4,310,136 | 1/1982 | Mooney | 248/278 |
| 4,487,389 | 12/1984 | Ziegler | 248/282 |
| 4,815,683 | 3/1989 | Ferrante | 248/205.2 |
| 4,836,478 | 6/1989 | Sweere | 248/1 E |
| 4,884,420 | 12/1989 | Finkel et al. | 70/58 |
| 4,964,606 | 10/1990 | Beam et al. | 248/333 |
| 4,966,342 | 10/1990 | Noguera | 248/172 |
| 4,984,690 | 1/1991 | King et al. | 206/503 |
| 5,009,384 | 4/1991 | Gerke et al. | 248/343 |
| 5,039,044 | 8/1991 | Sher | 248/176 |
| 5,074,512 | 12/1991 | Gianforcaro, II et al. | 248/442.2 |
| 5,082,235 | 1/1992 | Crowther et al. | 248/918 |
| 5,104,081 | 4/1992 | Sparks | 248/229 |
| 5,139,223 | 8/1992 | Sedighzadeh | 248/324 |
| 5,160,104 | 11/1992 | Sher | 248/176 |
| 5,393,025 | 2/1995 | Franklin | 248/317 |
| 5,400,993 | 3/1995 | Hamilton | 248/278 |
| 5,786,861 | 7/1998 | Parker | 248/442.2 |
| 5,796,378 | 6/1998 | Correa | 248/442.2 |
| 5,797,568 | 8/1998 | Canton Gongora et al. | 248/122.1 |

*Primary Examiner*—Ramon O. Ramirez
*Assistant Examiner*—Tan Le
*Attorney, Agent, or Firm*—Darby & Darby

[57] ABSTRACT

A mounting apparatus providing a horizontal shelf for securely stacking one component, such as a VCR, over a second component, such as a video display. The apparatus has struts which extend downwards from the sides of the shelf to flank the second component when the shelf is placed on top of it. An attachment mechanism in each strut is adjusted to clamp the apparatus securely to the second component. Upward struts may also be provided with similar attachment mechanisms to secure the stacked component to the shelf. The apparatus can be formed a single molded piece or have removable struts which are positioned as needed. The shelf can be a single component or be divided lengthwise and connected in a manner allowing for an adjustable depth.

14 Claims, 4 Drawing Sheets

TV/VCR MOUNT

TECHNICAL FIELD

This invention is related to a mounting apparatus used to securely stack one component on top of another. More particularly, this invention relates to a horizontal shelf which is positioned on and attached to a video display to provide a secure base for a second component such as a VCR.

BACKGROUND OF THE INVENTION

Televisions and computer display terminals are almost universal fixtures in households and offices. However, these video displays are bulky and there is often the need to stack or otherwise position another component, such as a VCR, above the display to save space. Because the horizontal surface provided on the top of conventional video displays is limited in area, it is often impossible to securely place a component over the display without additional support mechanisms.

One arrangement which allows stacking of components is a cabinet which has separate shelves for the display and other stacked components. However, a cabinet is bulky and may not have sufficient depth to hold the video display. A cabinet may also interfere with the accessibility and ventilation of the components.

Another conventional arrangement is the use of a vertically adjustable holder as described in U.S. Pat. No. 5,160,104 to Sher. The Sher holder is comprised of two horizontal shelves connected by a pair of vertically adjustable supports. The video display is placed on top of the lower shelf and the upper shelf forms an area where other devices may be stacked. However, this arrangement requires that the lower shelf be placed underneath the video display, and thus it may be difficult to install and remove when used with bulky and/or heavy displays. Also, when used with larger displays, the lower shelf may interfere with the stability of the display and no mechanism is provided to secure the stacked component to the upper shelf.

An alternative conventional arrangement for supporting a VCR over a video display is described in U.S. Pat. No. 4,996,342 to Noguera. The Noguera assembly is comprised of a frame which sits on top of the horizontal portion of the television display. The frame has two downwardly extending legs which rest on top of the sloping portion of the display case and can be adjusted so that the frame is horizontal. The width of the frame is adjusted to fit the dimensions of the VCR to be mounted. However, this assembly does not provide a true shelf, but merely a frame which may not properly fit around the stacked component. Also, this assembly is not secured to the television, but instead rests freely on top of it. Therefore, it may be accidentally pushed off of the display, causing damage to the stacked component.

SUMMARY OF THE INVENTION

Accordingly, it is an object of the present invention to provide a shelf which fits on top of a video display so that a VCR or other item can be stacked on the display.

It is another objection of the present invention to provide a shelf which can be securely attached to the video display.

Yet another object of the present invention is to provide a shelf which can securely hold a component in place on top of the shelf.

According to the present invention, a horizontal shelf for stacking a component over a video display is provided. The shelf has vertical struts which extend upwards and downwards from the sides of the shelf. The shelf is placed on top of a video display so that the struts flank the display and is secured to it by an adjustable clamp-like mechanism. The upward portion of the struts have a similar clamp-like mechanism which secures the stacked component to the shelf.

In a first embodiment, the shelf and struts are formed as a single component, e.g., from molded plastic. In a second embodiment, the vertical struts are separately attached to the shelf. This arrangement allows the placement of the struts to be varied based the particular display and stacked component it will be used for. In a third embodiment, separate upper and lower vertical struts may be attached to the shelf as required. The shelf is also divided lengthwise into two parts which are held together by a track. This arrangement advantageously allows the number and placement of the struts to be optimized to best fit the display and stacked component and also allows the depth of the shelf to be adjusted as needed. In a fourth embodiment, the upper and lower vertical struts are positioned within a guide track running across the width of the shelf so that the side-to-side position of each strut may be varied to better accommodate components of varying widths.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

Figure 1:
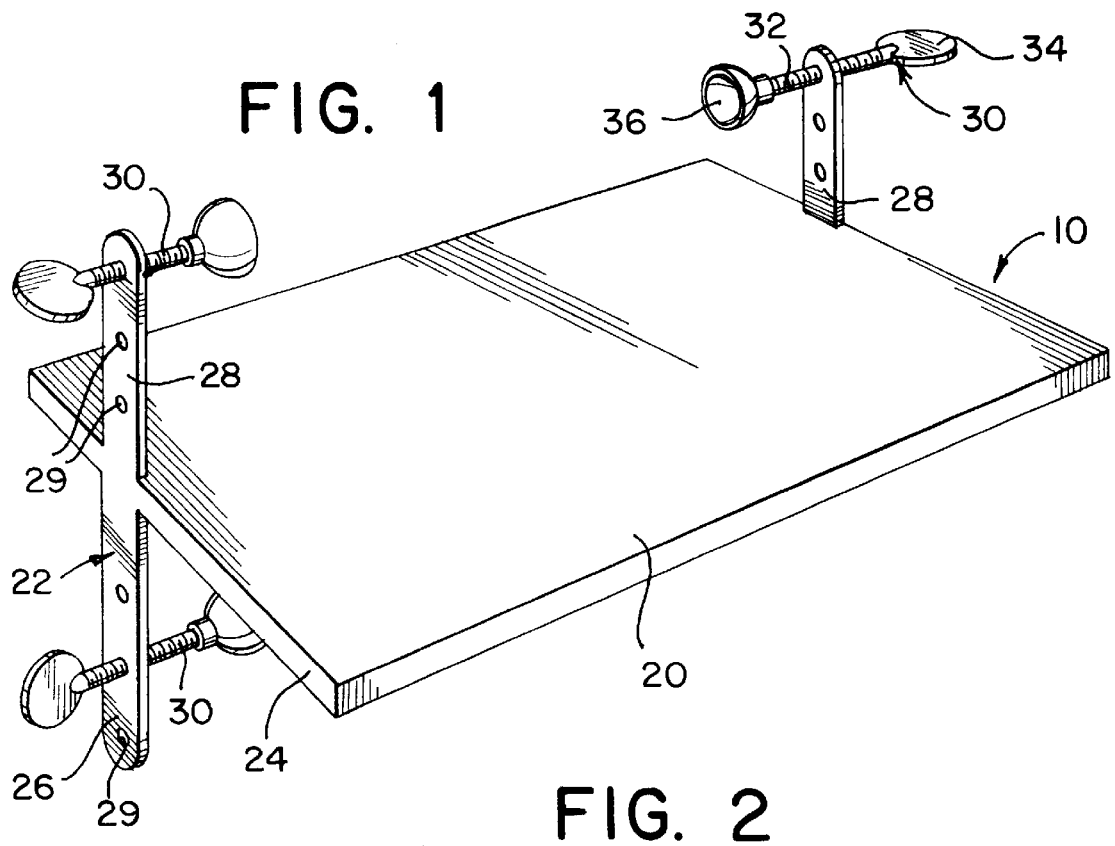
FIG. 1 is a perspective view of one embodiment of a mounting assembly according to the present invention.
Figure 2:
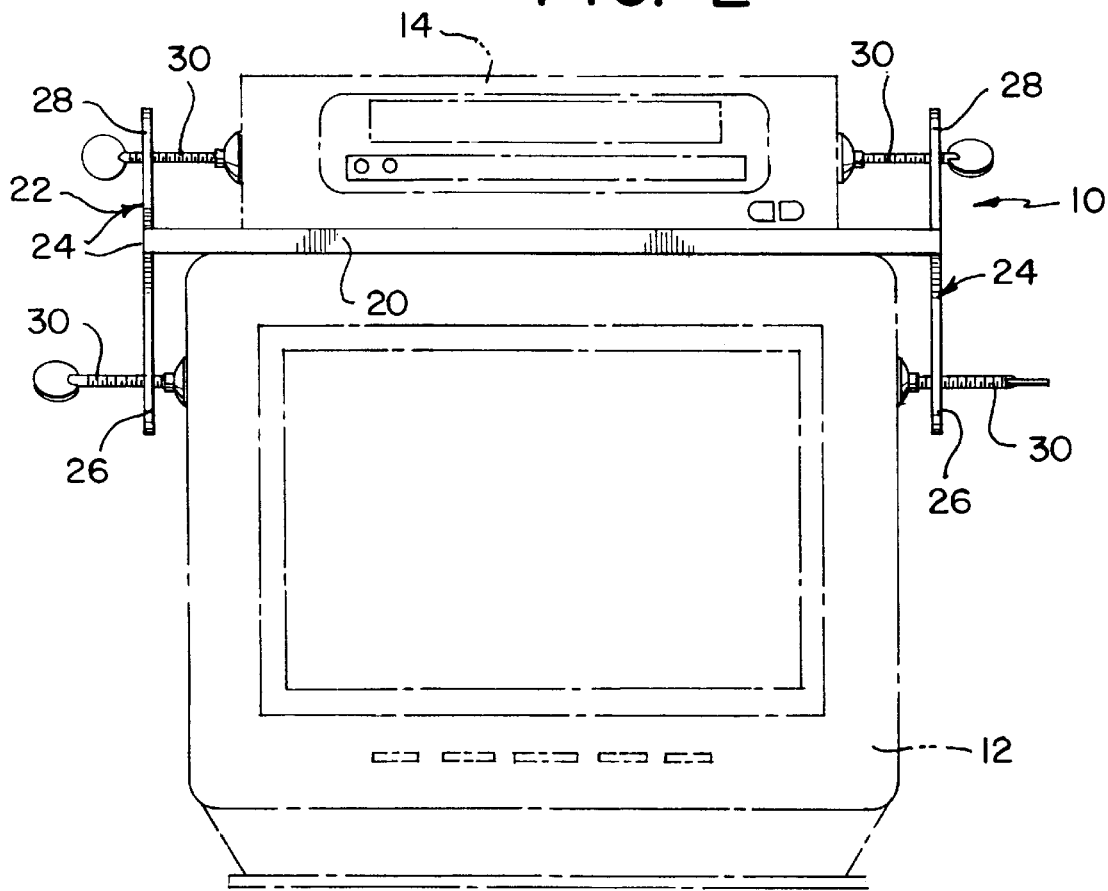
FIG. 2 is a front view of the mounting assembly of FIG. 1 secured to a video display and supporting a VCR.
Figure 3:
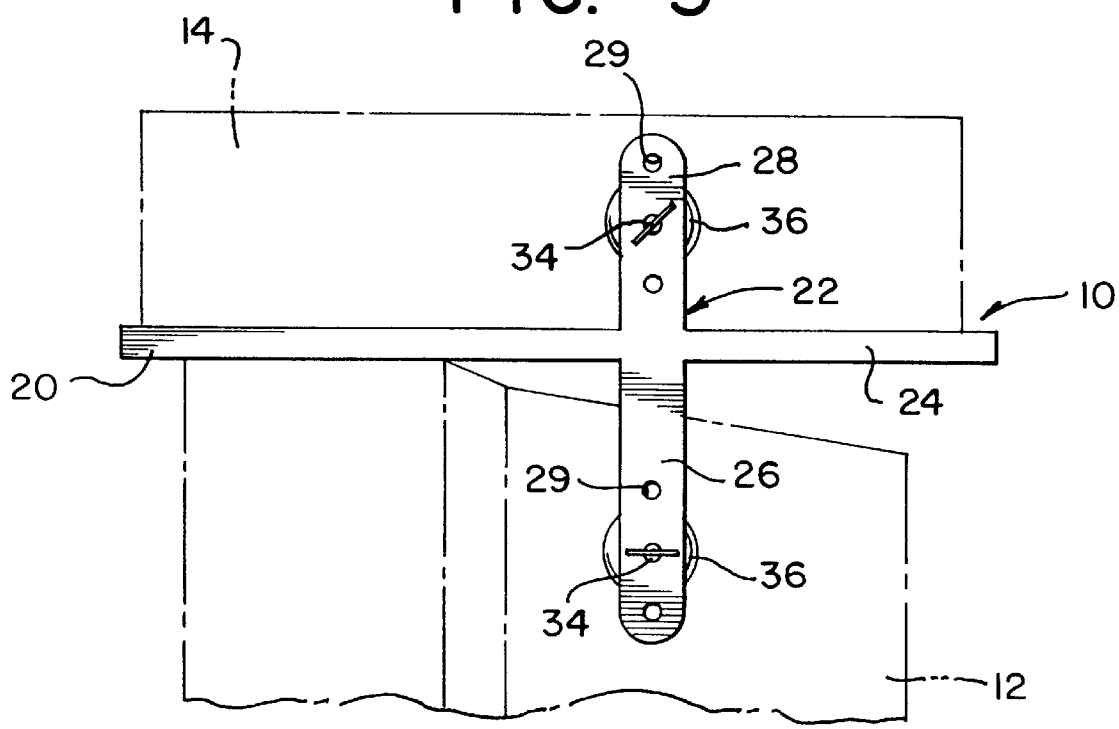
FIG. 3 is a side view of the mounting assembly of FIG. 2.

FIGS. 1 to 3 show a first embodiment of a mounting assembly 10 according to the present invention. As shown in FIGS. 2 and 3, assembly 10 is mounted to a video display 12 and used to support a component 14 such as a VCR. With reference to FIG. 1, the mounting assembly 10 is comprised of a horizontal shelf 20 having at least one vertical strut 22 extending from each of the sides 24. Vertical struts 24 have lower portions 26, upper portions 28, and a plurality of threaded apertures 29 which receive mounting hardware 30. The mounting hardware 30 is comprised of a threaded shaft 32 which engages the threaded aperture 29. The outer end of the shaft 32 has grasping means 34 which can be a knob, thumbscrew, or slot for a screwdriver. The inner end of the shaft 32 has a pad 36 such as a suction cup. In this embodiment, the shelf 20 and struts 22 are formed as a single unit, preferably from molded plastic.

With reference to FIGS. 2 and 3, the mounting assembly 10 is positioned on the display 12 so that the lower portion 26 of struts 22 flank the sides 13 of display 12. To secure shelf 20 to display 12, the grasping means 34 is turned to adjust the position of each of the shafts 32 within apertures 29 so that pads 36 are firmly pressed against the sides 13 of the display 12 and thereby clamp the shelf 20 to the display 12 in a stable and horizontal position. The upper portions 28 of the struts 22 have similar apertures 29 and mounting hardware 30 which is used to secure component 14 to shelf 20 as illustrated. Several threaded apertures 29 may be provided in the lower and upper portions 26, 28 of struts 22 so that the vertical position of the mounting hardware 30 may be adjusted as required.

Figure 4:
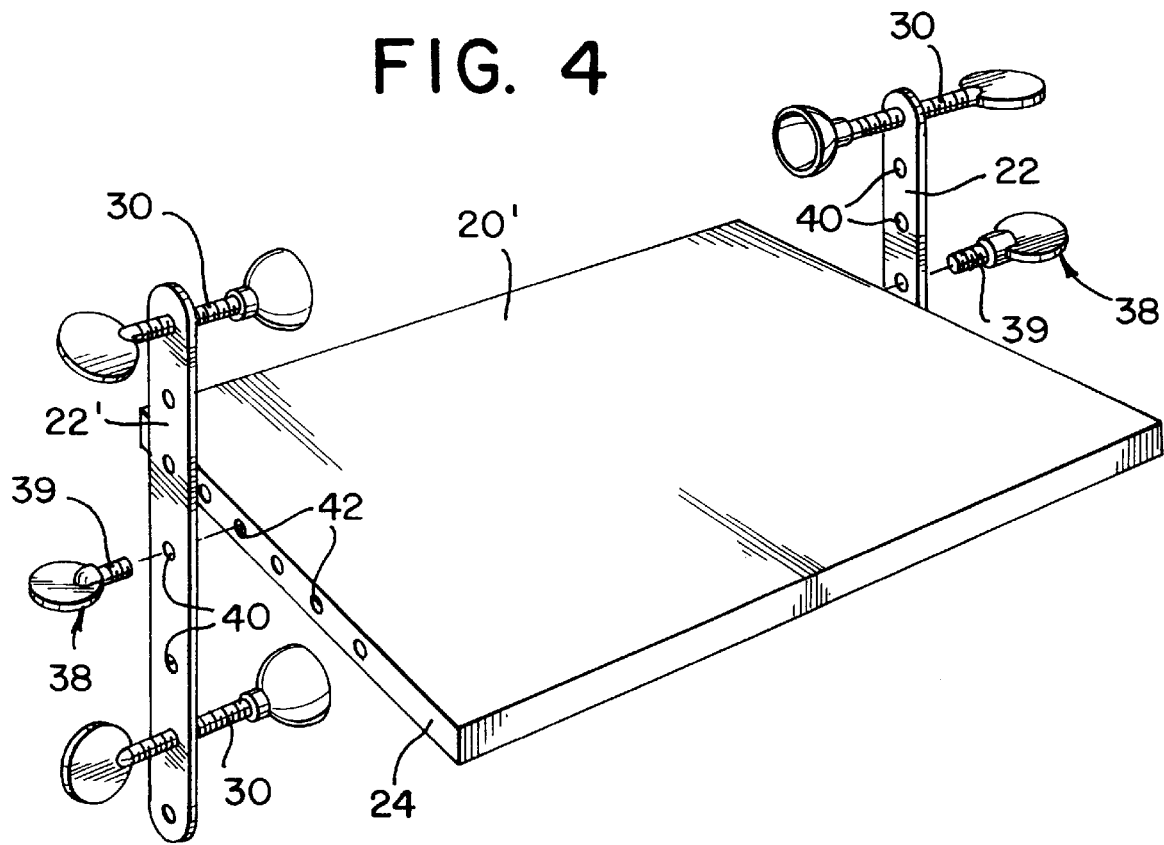
FIG. 4 is a perspective view of a second embodiment of a mounting assembly according to the present invention.

A second embodiment of the present invention is illustrated in FIG. 4. In this embodiment, vertical struts 22' are formed separately from the horizontal shelf 20. A strut 22' is attached to the side 24 of shelf 20 by strut mounting means 38. Preferably, strut mounting means 38 comprises a screw 39 which passes through a mounting aperture 40 in strut 22' and into one of many strut mounting holes 42 in the side 24 of shelf 20. Depending on the size of screw 39, mounting aperture 40 may be the same as threaded apertures 29. Alternate attachment means such as pegs, clips, or snap-together components may also be used. This embodiment advantageously allows the position of struts 22' along the sides 24 of shelf 20 to be selected to best match the display 12 on which mounting assembly 10 is placed.

Figure 5:
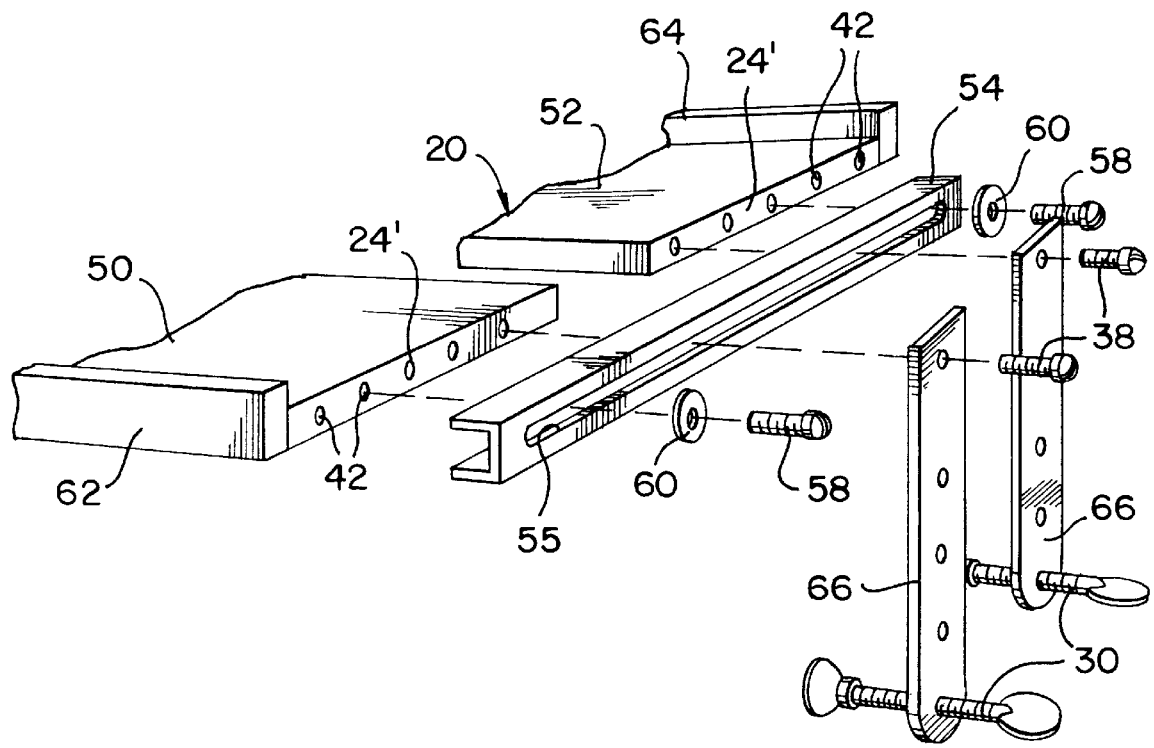
FIG. 5 is an exploded perspective view of a third embodiment of a mounting assembly according to the present invention.
Figure 6:
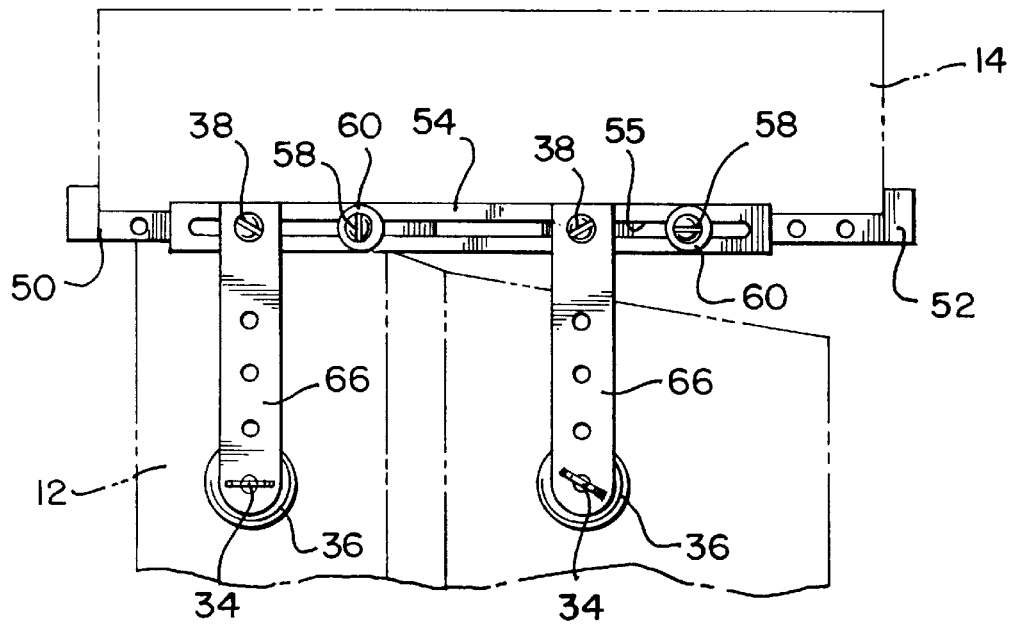
FIG. 6 is a side view of the mounting assembly of FIG. 5 secured to a video display and supporting a component.

A third embodiment of the present invention is illustrated in FIGS. 5 and 6. In this embodiment, the shelf 20 is divided lengthwise into two portions 50, 52. The distance between shelf portions 50 and 52 may be adjusted to thereby adjust the depth of shelf 20. The shelf portions 50, 52 are secured together by a shelf track 54. Preferably, track 54 is secured by means of screws 58 and washers 60 that pass through slot 55 in the track 54 into holes 42 in sides 24' of the shelf portions 50, 52. Shelf portions 50, 52 may also be provided with front and rear lips 62, 64, respectively, to provide a more secure shelf on which to place the component 14.

Also illustrated in FIGS. 5 and 6 is the use of alternate vertical struts 66. Struts 66 are substantially the lower portion 26 (or upper portion 28) of struts 22' shown in FIG. 4 and are attached to shelf parts 50, 52 by a strut mounting means 38 as described above. Alternate struts 66 may be used whenever only an upper or lower strut portion is desired. Struts 22' and 66 may be used interchangeably or in combination in this embodiment and in the second embodiment, shown in FIG. 4 and discussed above.

Figure 7:
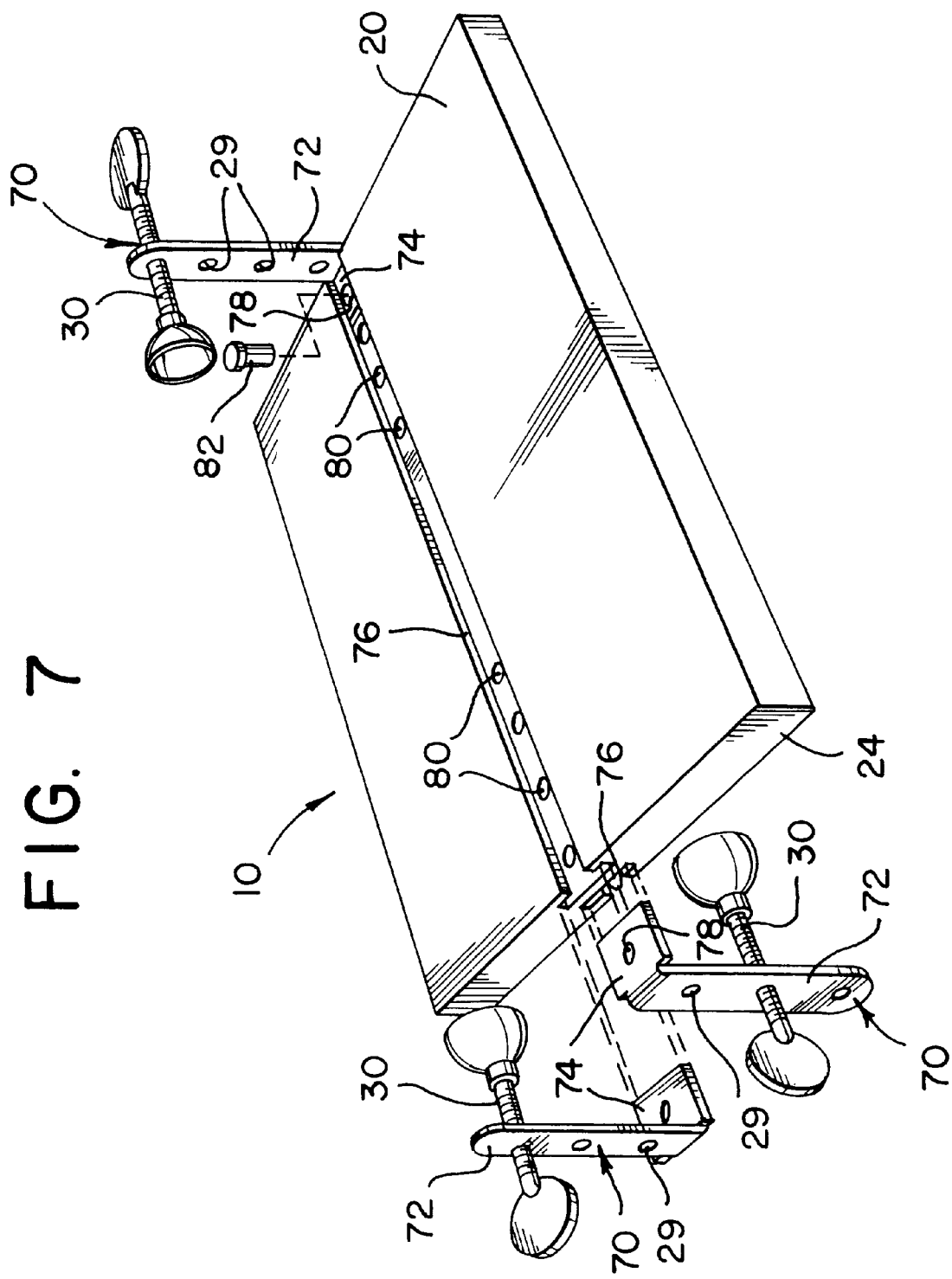
FIG. 7 is a perspective view of a fourth embodiment of a mounting assembly according to the present invention.

A fourth embodiment of the invention is illustrated in FIG. 7. This embodiment uses alternate struts 70 each comprising a vertical strut portion 72 for supporting the mounting hardware 30 in threaded apertures 29 and a foot-portion 74 extending at substantially a right angle from one end of strut portion 72. A guide track 76 is formed across the width of shelf 20 for slidably receiving the foot-portion 74 of the strut 70 so that the position of each strut 70 may be varied along guide track 76. In the preferred embodiment, two guide tracks will be formed in the shelf 20, one on its upper surface for receiving upwardly directed struts, and one in its lower surface, for receiving downwardly directed struts. Additional guide tracks may also be formed to support additional struts or provide for front-to-back positioning ability of the struts as required.

Each strut 70 is maintained in its desired position within guide track 76 by a locking assembly. In the preferred embodiment, the locking assembly comprises a plurality of receiving holes 80 along the length of guide track 76 and an aperture 78 in foot-portion 74. The strut 70 is positioned along guide track 76 so that aperture 78 is aligned with one of the receiving holes 80 and is locked into place by locking member 82 which extends through aperture 78 and into the opposing receiving hole 80. In one embodiment, locking member 82 is a peg. Other locking members such as spring-loaded catches and other mechanisms such as ratchet arrangements and the like may also be used as will be apparent to those skilled in the art.

It can be appreciated that the present invention is not limited to stacking a component such as a VCR over a video display, but can used to mount a variety of different components. Examples include as mounting a printer over a computer or stacking stereo or laboratory equipment.

While the invention has been particularly shown and described with reference to preferred embodiments thereof, it will be understood by those skilled in the art that various changes in form and details may be made therein without departing from the spirit and scope of the invention.

We claim:

1. A mounting apparatus for securely stacking a first component above a second component comprising:

a substantially flat horizontal shelf suitable for supporting the first component when the shelf is positioned on top of said second component, the shelf having left and eight sides, a width, a thickness, and a depth, the width and depth being substantially greater than the thickness;

a downward strut extending from each said side, each said downward strut having an inwardly directed threaded aperture through which a first threaded shaft with inner and outer ends extends in a threaded engagement with said aperture, said downward struts flanking said second component;

the inner end of each of said first shafts terminating at a respective pad; and the outer end of each of said first shafts having a grasping means for manually adjusting the position of said shafts within said respective apertures so that said pads frictionally engage the second component to thereby clamp said mounting apparatus to the second component;

an upward strut extending from each said side, each said upward strut having an inwardly directed threaded aperture through which a second threaded shaft with inner and outer ends extends in a threaded engagement with said aperture, said upward struts flanking said first component;

the inner end of each of said second shafts terminating at a respective pad; and the outer end of each of said second shafts having a grasping means for manually adjusting the position of said second shafts within said respective apertures so that said pads frictionally engage the first component to thereby secure the first component to said mounting apparatus.

2. The apparatus of claim 1, wherein on each said side, a corresponding upward strut and downward strut are integrally formed as a single element.

3. The apparatus of claim 2, wherein said upward and downward struts are permanently attached to said shelf.

4. The apparatus of claim 3, wherein said upward struts, downward struts, and said shelf comprise a single molded form.

5. The apparatus of claim 1, wherein:

said shelf further comprises at least one guide track extending laterally across the width of said shelf;

a strut extending from the left side is slidably engaged with a guide track so that the position of said strut relative to the left side of said shelf may be varied; and a strut extending from the right side and opposed to said slidably engaged left strut is slidably engaged with a guide track so that the position of said strut relative to the right side of said shelf may be varied.

6. The apparatus of claim 5, further comprising a locking assembly to retain said slidably engaged struts at fixed positions within said at least one guide track.

7. The apparatus of claim 5, wherein:

each said guide track has a plurality of receiving holes;

each said slidably engaged strut comprises a substantially horizontal foot portion having an aperture therein, said foot portion engaging one said guide track so that said aperture may be positioned in alignment with one of said receiving holes; and a locking member for engaging said aperture in said foot portion and said aligned receiving hole to thereby lock said slidably engaged strut at a fixed position within said at least one guide track.

8. A Mounting apparatus for securely stacking a first component above a second component comprising:

a substantially flat horizontal shelf suitable for supporting the first component when the shelf is positioned on top of said second component, the shelf having left and right sides, a width, a thickness, and a depth, the width and depth being substantially greater than the thickness;

a strut extending downward from each said side, each said downward strut having an inwardly directed threaded aperture through which a threaded shaft with inner and outer ends extends in a threaded engagement with said aperture, said downward struts flanking said second component;

the inner end of each of said shafts terminating at a pad; and the outer end of each of said shafts having a grasping means for manually adjusting the position of said shafts within said apertures so that said pads frictionally engage the second component to thereby clamp said mounting apparatus to the second component;

said downward struts being removably attached to said shelf by a screw passing through a mounting aperture in said downward strut and engaging one of a plurality of strut mounting holes distributed along the corresponding side of said shelf.

9. A Mounting apparatus for securely stacking a first component above a second component comprising:

a substantially flat horizontal shelf suitable for supporting the first component when the shelf is positioned on top of said second component, the shelf having left and right sides, a width, a thickness, and a depth, the width and depth being substantially greater than the thickness;

a strut extending downward from each said side, each said downward strut having an inwardly directed threaded aperture through which a threaded shaft with inner and outer ends extends in a threaded engagement with said aperture, said downward struts flanking said second component;

the inner end of each of said shafts terminating at a pad; and the outer end of each of said shafts having a grasping means for manually adjusting the position of said shafts within said apertures so that said pads frictionally engage the second component to thereby clamp said mounting apparatus to the second component;

said shelf comprising:

a forward shelf part having left and right sides;

a rear shelf part having left and right sides;

a left shelf track connecting the left side of said forward shelf part with the left side of said rear shelf part; and a right shelf track connecting the right side of said forward shelf part with the right side of said rear shelf part;

the distance between said forward and rear shelf parts being manually adjustable.

10. The apparatus of claim 9, wherein each said shelf track has a substantially C-shaped cross-section for receiving the corresponding side of forward and rear shelf parts and at least one elongated slot, wherein each said shelf track is attached to the corresponding sides of said forward and rear shelf parts by a plurality of screws passing through said at least one elongated slot.

11. A Mounting apparatus for securely stacking a first component above a second component comprising:

a substantially flat horizontal shelf suitable for supporting the first component when the shelf is positioned on top of said second component, the shelf having left and right sides, a width, a thickness, and a depth, the width and depth being substantially greater than the thickness, said shelf further comprising an upwardly directed front lip and an upwardly directed rear lip;

a strut extending downward from each said side, each said downward strut having an inwardly directed threaded aperture through which a threaded shaft with inner and outer ends extends in a threaded engagement with said aperture, said downward struts flanking said second component;

the inner end of each of said shafts terminating at a pad; and the outer end of each of said shafts having a grasping means for manually adjusting the position of said shafts within said apertures so that said pads frictionally engage the second component to thereby clamp said mounting apparatus to the second component.

12. A Mounting apparatus for securely stacking a first component above a second component comprising:

a substantially flat horizontal shelf suitable for supporting the first component when the shelf is positioned on top of said second component, the shelf having left and right sides, a width, a thickness, and a depth the width and depth, being substantially greater than the thickness;

a strut extending downward from each said side, each said downward strut having an inwardly directed threaded aperture through which a threaded shaft with inner and outer ends extends in a threaded engagement with said aperture, said downward struts flanking said second component;

the inner end of each of said shafts terminating at a pad; and the outer end of each of said shafts having a grasping means for manually adjusting the position of said shafts within said apertures so that said pads frictionally engage the second component to thereby clamp said mounting apparatus to the second component said shelf further comprising a guide track extending laterally across the width of said shelf; and at least one strut is slidably engaged with said guide track so that the position of said strut relative to the sides of said shelf may be varied.

13. The apparatus of claim 12, further comprising a locking assembly to retain said slidably engaged strut at a fixed position within said guide track.

14. The apparatus of claim 12, wherein:

said guide track has a plurality of receiving holes;

said slidably engaged strut comprises a substantially horizontal foot portion having an aperture therein, said foot portion engaging said guide track so that said aperture may be positioned in alignment with one of said receiving holes; and a locking member for engaging said aperture in said foot portion and said aligned receiving hole to thereby retain said slidably engaged strut at a fixed position within said guide track.

\* \* \* \* \*